(12) United States Patent
Bauer et al.

(10) Patent No.: US 6,859,989 B2
(45) Date of Patent: Mar. 1, 2005

(54) FIXTURE AND METHOD FOR ASSEMBLING STRUCTURES

(75) Inventors: Eric Talbott Bauer, Canton, OH (US); Paul Edward Miller, Alliance, OH (US); Jeffrey R. Wittlinger, Massillon, OH (US); Gary E. Gerstenslager, Canton, OH (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 10/430,576

(22) Filed: May 6, 2003

(65) Prior Publication Data
US 2004/0010904 A1 Jan. 22, 2004

Related U.S. Application Data

(60) Provisional application No. 60/396,275, filed on Jul. 16, 2002.

(51) Int. Cl.$^7$ ............................... B23Q 7/00; B23Q 3/00
(52) U.S. Cl. ........................ 29/559; 29/464; 29/281.1; 269/50; 269/71; 269/296; 269/309
(58) Field of Search .......................... 29/559, 434, 464, 29/281.1, 281.4; 269/47, 50, 52, 69, 71, 249, 258, 296, 309

(56) References Cited

U.S. PATENT DOCUMENTS

| | | | | |
|---|---|---|---|---|
| 1,589,085 A | | 6/1926 | Anderson et al. | |
| 4,730,379 A | * | 3/1988 | Chen | 29/434 |
| 5,575,318 A | * | 11/1996 | Susnjara | 144/2.1 |
| 5,664,311 A | * | 9/1997 | Banks et al. | 29/407.04 |
| 5,918,358 A | * | 7/1999 | Ffield et al. | 29/559 |
| 6,170,141 B1 | * | 1/2001 | Rossway et al. | 29/281.1 |
| 6,375,178 B1 | | 4/2002 | Schilb et al. | |
| 6,427,322 B1 | * | 8/2002 | DeCecca et al. | 29/806 |
| 6,450,490 B1 | | 9/2002 | Mangelsen et al. | |
| 6,546,616 B2 | * | 4/2003 | Radowick | 29/720 |
| 6,578,247 B2 | * | 6/2003 | Walker et al. | 29/281.4 |
| 6,591,476 B2 | * | 7/2003 | DeCecca et al. | 29/464 |
| 6,615,478 B2 | * | 9/2003 | Walker et al. | 29/559 |
| 6,629,354 B1 | * | 10/2003 | Kline | 29/559 |
| 6,708,394 B2 | * | 3/2004 | Busnardo et al. | 29/723 |
| 2002/0092149 A1 | * | 7/2002 | Wolf et al. | 29/464 |
| 2002/0113354 A1 | | 8/2002 | Mangelsen et al. | |

* cited by examiner

Primary Examiner—Essama Omgba
(74) Attorney, Agent, or Firm—Buckingham, Doolittle & Burroughs; David P. Dureska; David J. Hrina

(57) ABSTRACT

An improved fixture and method for assembling a structure, wherein the improved fixture comprises a frame and a pair of position compliance devices. The compliance devices are attached to a selected one of the ends of the fixture frame for engagement with the arms of a selected one of a headstock and a tailstock used to rotate the fixture and structure to be assembled. The compliance devices each comprise a slidable block having a locating pin rotatably mounted therein, which enables the fixture to be accurately and removably positioned between a headstock and a tailstock, serving to reduce unwanted stress on the fixture and the structure to be assembled during rotation. Removability of the fixture and structure to be assembled facilitates convenient loading/unloading of the structure and 360 degree access to the structure and fixture by an operator.

20 Claims, 6 Drawing Sheets

FIXTURE AND METHOD FOR ASSEMBLING STRUCTURES

This application claims the benefit of Ser. No. 60/396,275 filed on Jul. 16, 2002.

BACKGROUND OF THE INVENTION

1. Field of the Invention

The invention relates to an improved fixture and a method for removably and accurately positioning the fixture between a headstock and a tailstock, and in particular to an improved fixture suitable for conveniently loading and unloading large structures to be assembled and that provides an operator with 360 degree access to the improved fixture and the structure. More particularly, the present invention is directed to an improved fixture having a frame and a plurality of position compliance devices, each comprising a movable block having a rotatably mounted locating pin, which enables the fixture to be accurately and repeatably positioned between the headstock and tailstock, and that serves to reduce stress on the fixture and the structure being assembled during rotation, which is undesirable if left unreduced.

2. Background Art

Fixtures or tools have been used for many years to facilitate the assembly of large structures such as a slider assembly for a semi-trailer. Because a structure such as a slider is comprised of many large components which must be precisely assembled for its eventual proper operation as a subframe component of a semi-trailer or tractor-trailer, it is typically assembled predominantly by welding on a special fixture designed to hold such large structures. Traditionally, such a prior art fixture was permanently bolted or otherwise affixed to large headstock and tailstock structures, and the slider had to be assembled and welded on the non-removable fixture. Such an arrangement, while resulting in satisfactory assembly of the slider, had certain disadvantages. One disadvantage has been the difficulty of loading and unloading large structures onto the fixture with overhead cranes or lifting tools, and also that the operator/assembler had access to only one side of the fixture.

Heretofore, others have contemplated a removable fixture to overcome the problems of loading/unloading and operator access inherent when the fixture is non-removably mounted on the headstock/tailstock structures, but until applicants' invention the objective has not been satisfactorily achieved. More particularly, the problem that has remained unsolved has been that of obtaining repeatable and precise alignment of the centerline axis of the fixture between the headstock and tailstock structures. Any misalignment can cause unwanted stresses on the fixture and the structure being assembled, such as during 360 degree rotation of the fixture by the headstock structure for welding a slider. If fixture misalignment exists, the slider can be subjected to twisting stresses, or moments, during such rotation. Even without such misalignment, the structure being assembled is subjected to various less severe stresses during fixture rotation. Thus, in order to eliminate such problems, the fixture had to be realigned each time it was reinserted between the headstock and tailstock structures. Such realignment is inefficient.

The present invention solves the above-noted problems through the addition of at least one alignment compliance device to each side of either the tailstock end or the headstock end of the fixture frame, said compliance device comprising a movable block having a rotatably mounted locating pin, and a stationary pin passing through the movable block for capturing at least one tension device located thereon on each side of the movable block. The movable blocks, the locating pins and the tension devices substantially self-align the fixture each time it is reinserted between the headstock and tailstock structures, and also substantially reduce stresses on the fixture and structure being assembled during rotation.

SUMMARY OF THE INVENTION

Objectives of the present invention include providing a fixture and a method for removably and accurately positioning the fixture and a structure to be assembled thereon between a headstock and a tailstock, so that an operator will have 360 degree access to the fixture and the structure.

A further objective of the present invention is to provide such a removable fixture which facilitates efficient loading and unloading of structures onto and from, respectively, the fixture.

Another objective of the present invention is to provide such a fixture that reduces stress on the fixture, and the structure being assembled thereon, during rotation.

These objectives and advantages are obtained by the improved fixture and method for assembling structures of the present invention, the general nature of which may be stated as including, an improved fixture for removably holding a structure to be assembled, the fixture being removably mountable between a headstock and a spaced-apart tailstock for moving the fixture for assembly, the fixture including a frame having a first end and a second end, and a selected one of the first and second ends being immovably attached to a selected one of the headstock and the tailstock, wherein the improved fixture comprises, a pair of positioning devices mounted on the other one of the selected first and second ends of the fixture frame, the positioning devices each being movable in the direction of the headstock and the tailstock and having a rotatably mounted locating pin for engaging the other one of the selected headstock and the tailstock, for reducing stress on the fixture and the structure to be assembled during movement of the fixture and the structure during assembly.

BRIEF DESCRIPTION OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

The objectives of the present invention are achieved in the following manner. A conventional stationary driving headstock 10 and a follower tailstock 11 which are spaced-apart and aligned is depicted in the left-hand portion of FIG. 1. Headstock 10 is of a type commonly known in the prior art and includes a pair of headstock arms 12. Similarly, tailstock 11 also is of a type commonly known in the prior art and also includes a pair of tailstock arms 13. Each one of the tailstock arms 13 preferably is generally C-shaped and is adapted for receipt of a locating pin, as will be described in greater detail hereinbelow.

Figure 1:
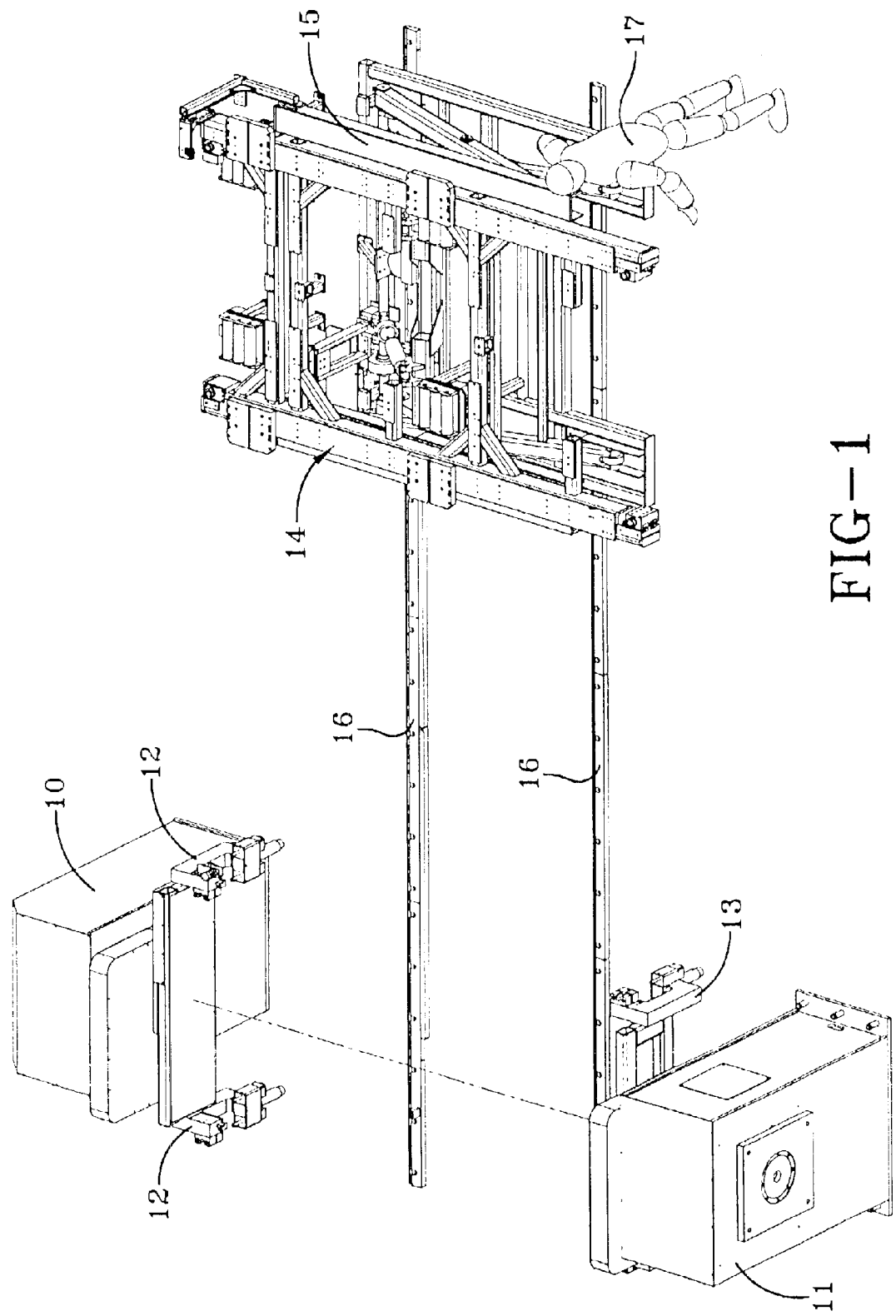
FIG. 1 is a perspective view of the improved fixture of the present invention removably mounted on a movable carrier, with the carrier and the fixture shown in a loading/unloading position prior to moving to a structure assembly position between a headstock and a tailstock.

A tool or fixture 14 of the present invention having first and second ends and commonly used in heavy industrial applications for assembling large structures, such as a slider assembly for a semi-trailer, and that can be removably and accurately positioned between headstock 10 and tailstock 11, is removably mounted on a cart or carrier 15, which is shown in its loading/unloading position in FIG. 1. Carrier 15 in turn is movably mounted on a pair of spaced-apart parallel tracks 16 which extend from a location between headstock 10 and tailstock 11 and outwardly sidewardly therefrom a sufficient distance in at least one direction to enable fixture 14 to clear the headstock and the tailstock and facilitate loading onto and unloading from the fixture a structure to be assembled on the fixture, as will be discussed more fully hereinbelow.

More specifically, components of the structure to be assembled (not shown) are placed on fixture 14 after it has been removed from between headstock 10 and tailstock 11 by carrier 15 (see right-hand portion of FIG. 1). An operator 17 is shown with 360 degree access to fixture 14 and the structure, so that he or she can perform any necessary functions prior to reinsertion of the fixture by carrier 15 between headstock 10 and tailstock 11 for additional operations, such as rotation of the fixture and the structure to be assembled, as by robotic welding, after removal of the carrier to the position shown in FIG. 2.

Figure 2:
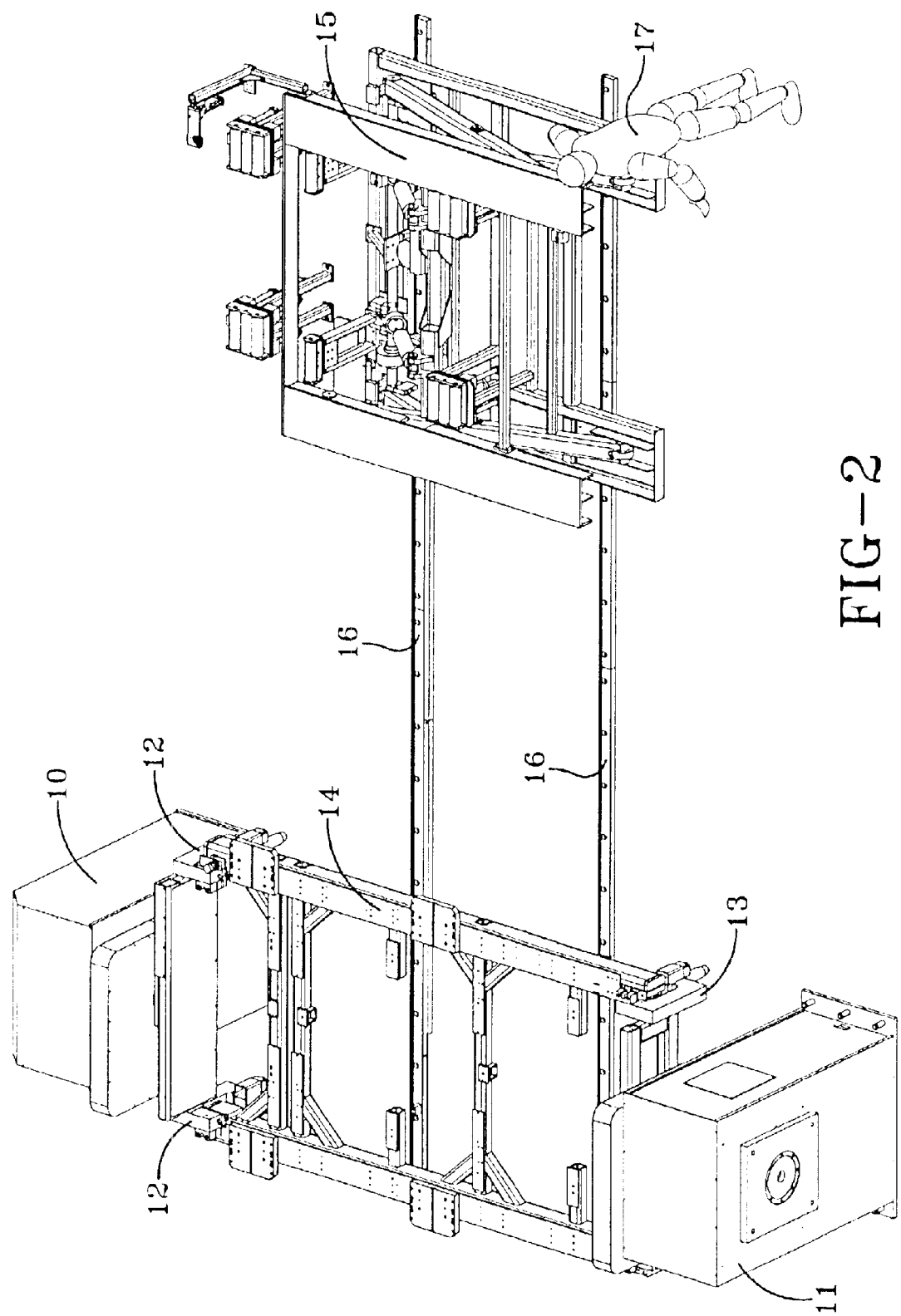
FIG. 2 is a view similar to FIG. 1, but showing the fixture removably and accurately positioned between the headstock and the tailstock, and the empty carrier returned to its initial loading/unloading position.
Figure 3:
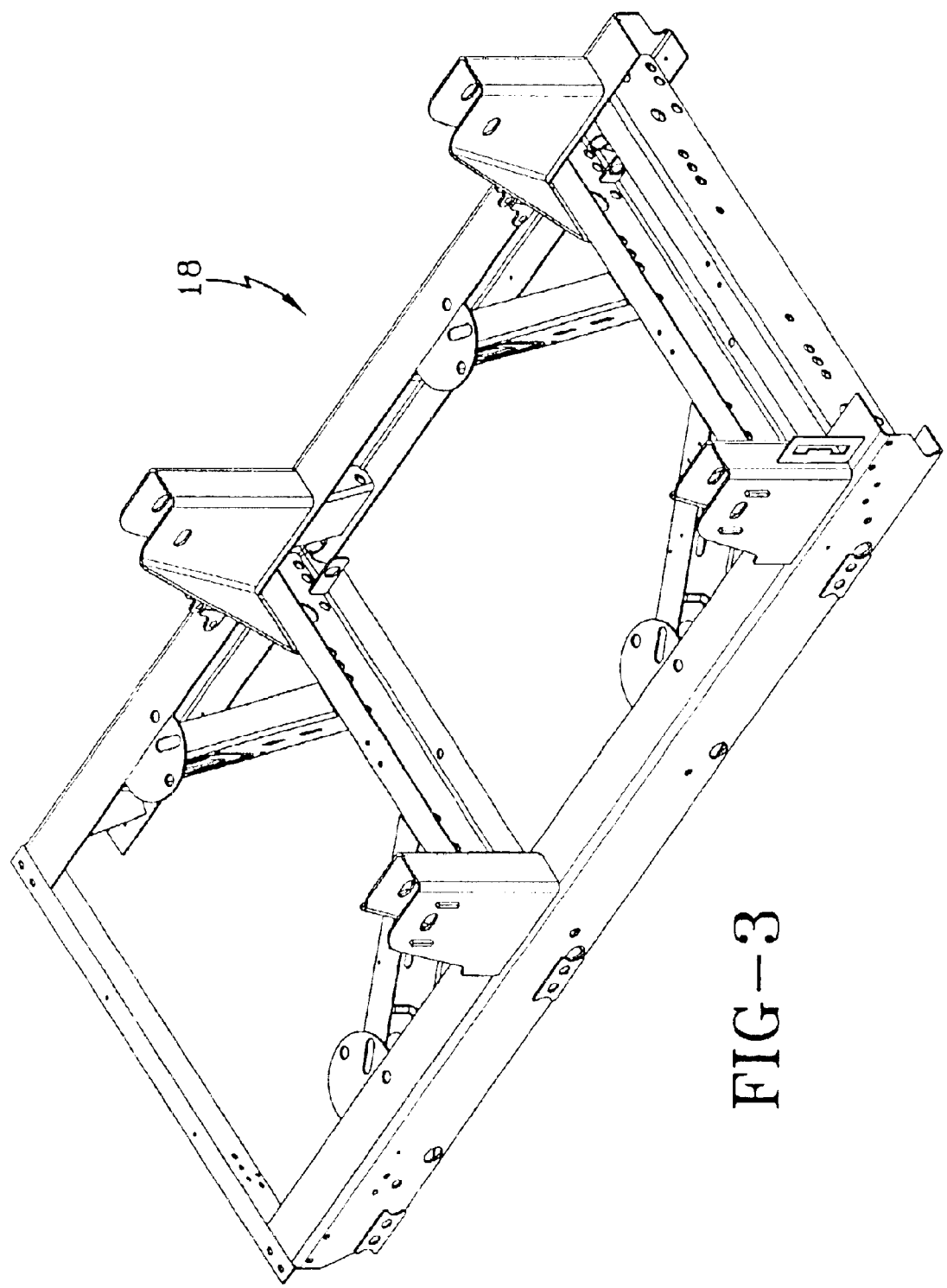
FIG. 3 is a bottom perspective view of a slider, which is representative of the type of structure that would be loaded onto/unloaded from the fixture and carrier when they are in the position illustrated in FIG. 1, and assembled on the fixture when it is in the position shown in FIG. 2.

FIG. 2 depicts the reinsertion of fixture 14 by carrier 15 between headstock 10 and tailstock 11 for assembly of a structure such as a slider (not shown), and the return of the empty carrier 15 to its initial loading/unloading position (see right hand portion of FIG. 2). FIG. 3 shows one type of semi-trailer slider structure 18 that is commonly assembled on fixture 14 between headstock 10 and tailstock 11, though other types of structures are also contemplated.

Figure 4:
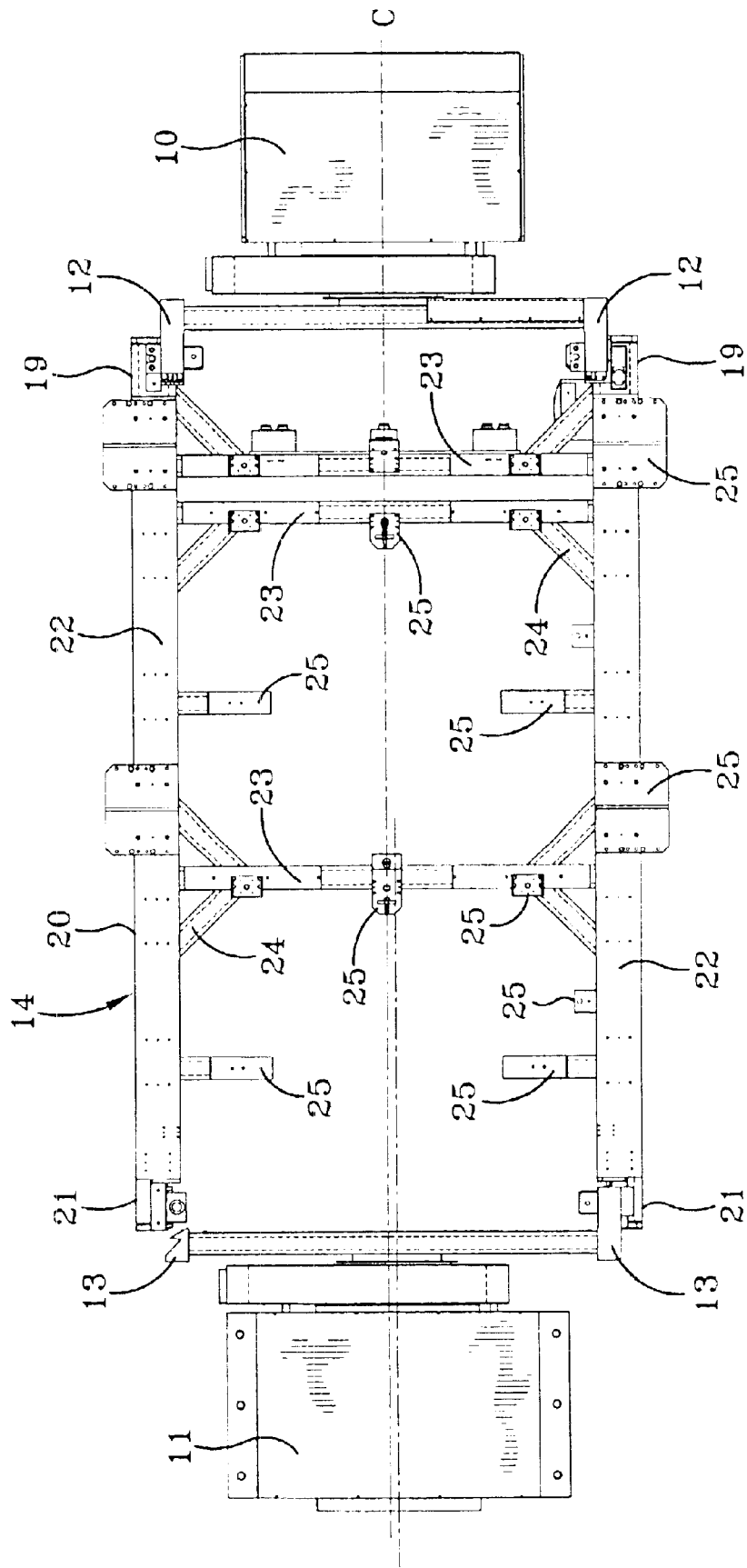
FIG. 4 is a top plan view of the fixture in the position depicted in FIG. 2, and showing the fixture removably and accurately positioned between the headstock and tailstock, with the fixture comprising a frame and a pair of position compliance devices.

A plan view of improved fixture 14 of the present invention removably and accurately positioned between headstock 10 and tailstock 11, and with carrier 15 removed, is depicted in FIG. 4. Fixture 14 comprises a frame 20, a position compliance device 21 securely attached to each side of the first end of frame 20, and an attachment element 19 securely attached to each side of the second end of frame 20. Alternatively, attachment element 19 could be securely attached to each side of the first end of frame 20 and a compliance device 21 securely attached to each side of the second end of frame 20, without affecting the overall concept of the present invention.

Fixture frame 20 is of a type commonly known in the prior art and comprises a pair of spaced, parallel, elongated side beams 22, and a plurality of spaced, parallel, elongated cross beams 23, each one of which extends between and is fixedly attached to side beams 22 by any suitable means, such as welds. A plurality of diagonally disposed support members 24 each is attached by any suitable means, such as welds, to respective ones of side beams 22 and cross beams 23 to provide additional structural support to frame 20. Frame 20 further comprises a plurality of removable mounting brackets 25 for securing the components of a structure to be assembled such as slider 18 to frame 20. Depending on the structure being assembled, mounting brackets 25 could be positioned in an infinite number of different configurations along frame 20, including along the top of, or extending inward or outward from, side beams 22 and cross beams 23. Unless otherwise noted, all components of frame 20 preferably are formed of a sturdy metal such as steel.

Figure 5:
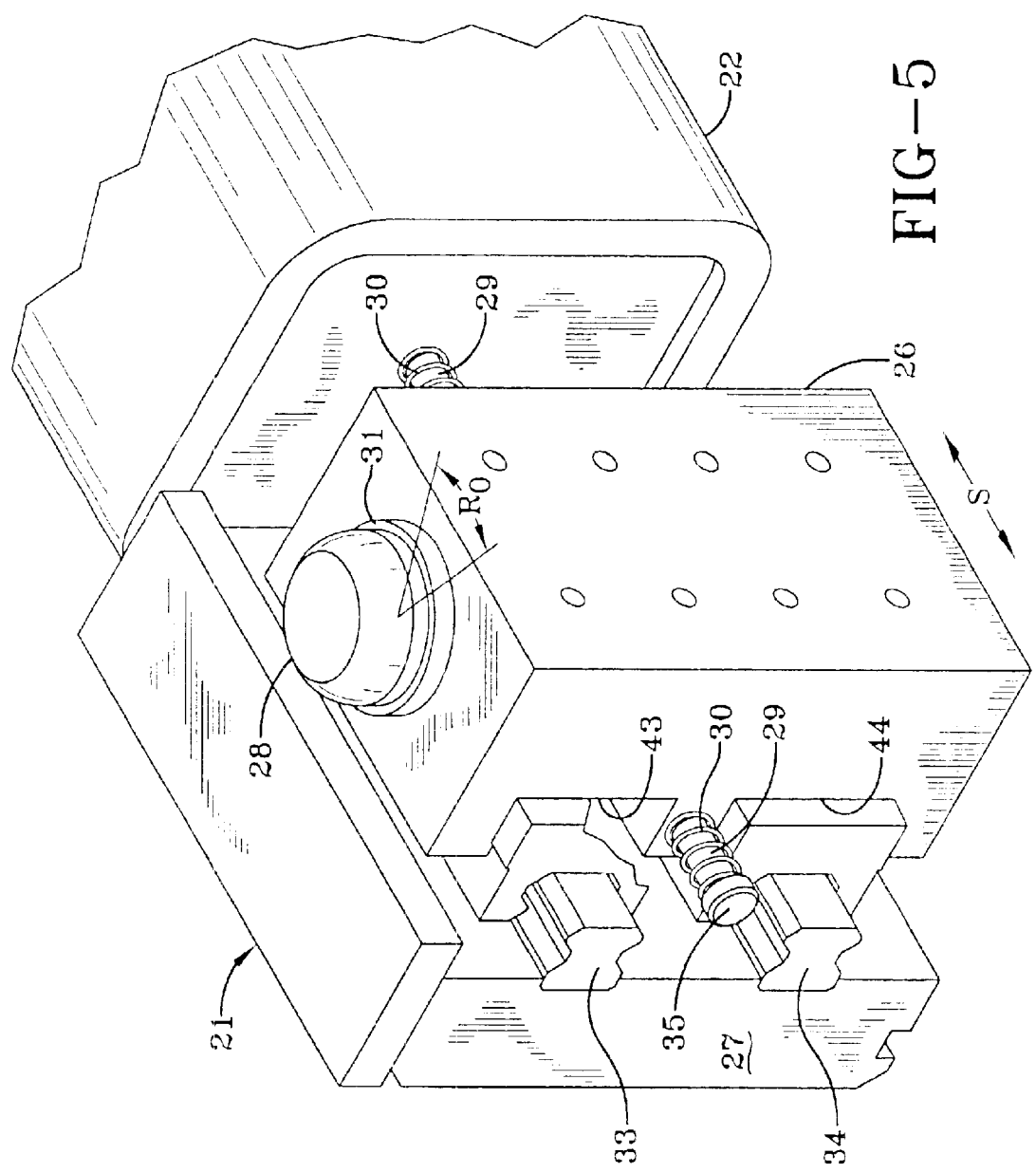
FIG. 5 is a fragmentary perspective view of the position compliance device shown movably attached to a frame of the fixture, wherein the compliance device comprises a block having a rotatably mounted locating pin, a base for slidably mounting the block on the frame, a stationary pin passing through the block, and at least one tension device disposed about the stationary pin on each side of and adjacent to the block.

In accordance with an important feature of the present invention, compliance device 21, which is best illustrated in FIG. 5, is attached to the first end of each side beam 22 by any suitable means, such as welds. Alternatively, it is also contemplated that compliance device 21 could be attached to the second end of each side beam 22 without affecting the objectives of the present invention. Compliance device 21 includes a block 26 which is slidably mounted on a base 27, a locating pin 28 passing vertically through and being rotatably mounted in block 26, and a stationary pin 29 passing horizontally through a continuous opening (not shown) formed in block 26, with a tension device 30, such as a spring, being disposed about the stationary pin on each side of and adjacent to block 26.

More specifically, stationary pin 29 is affixed to the first end of fixture side beam 22 by any suitable means, and extends longitudinally outwardly therefrom in the direction of tailstock 11. The outward end of pin 29 is formed with an increased diameter stop 35 to assist in capturing block 26 and tension devices 30 on the pin as will be described more fully hereinbelow. Although block 26 is slidably mounted on stationary pin 29, tension device 30, which preferably is a coil spring disposed about pin 29 on each side of and adjacent to block 26, prevents excessive movement of the block on the pin during use. Importantly, each tension device 30 is biased in the direction of block 26 and its tension can be appropriately increased or decreased to accurately position locating pin 28 for connection with tailstock arm 13 during operation as will be discussed hereinbelow.

Block 26 preferably is formed of steel and is formed with a vertically oriented continuous opening 36 for the receipt of locating pin 28. A pair of vertically-spaced apart bearings 31 are mounted in block opening 36, and locating pin 28 in turn is rotatably mounted in the bearings in a usual manner.

Figure 6:
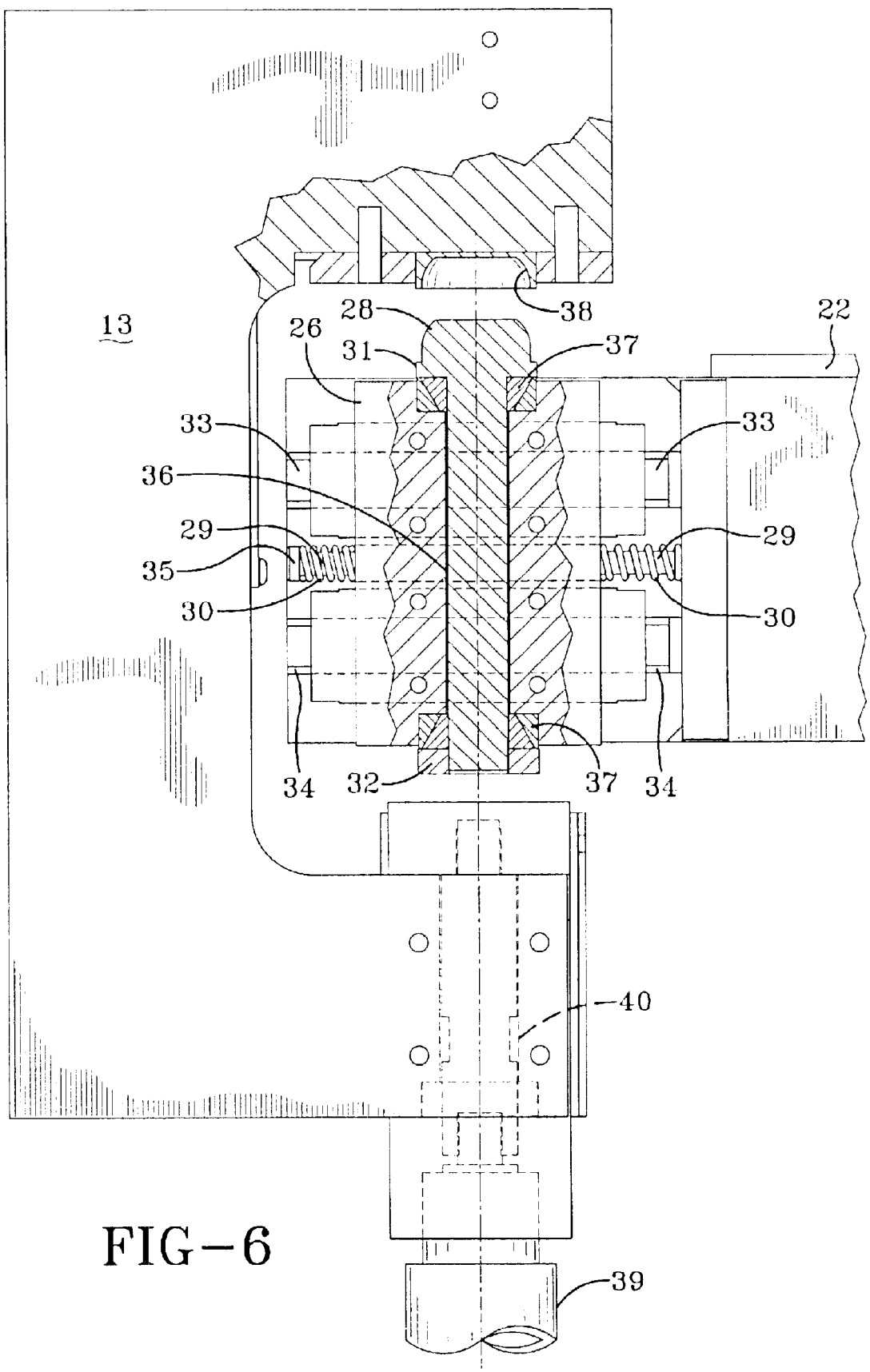
FIG. 6 is a side view of the compliance device of FIG. 5, with the block of the device illustrated in cross-section, shown positioned adjacent to the tailstock arm, the arm shown with portions broken away, fragmented, in section and in phantom lines, and further showing the rotatable locating pin, the base, the stationary pin, the tension devices, and upper and lower bearings of the compliance device, and the means for moving the locating pin into engagement with the arm.

In accordance with another important feature of the present invention, locating pin 28 thus is free to spin or rotate, as indicated by double-ended arrow R (FIG. 5), to accommodate rotational changes that can create stresses as fixture 14 is rotated between headstock 10 and tailstock 11. While capable of rotating within block 26, the lower end of locating pin 28 is threaded (not shown) and is attached to block 26 by any suitable means, such as through the use of a nut 32, as best illustrated in FIG. 6.

In accordance with yet another important feature of the present invention, base 27 preferably is formed of steel, is suitably attached to frame side beam 22, and comprises a sliding means upon which block 26 is vertically stabilized yet still is capable of moving in both longitudinal horizontal directions toward headstock 10 and tailstock 11, as indicated by double-ended arrow S (FIG. 5), and parallel to centerline C (FIG. 4) of tailstock 11 and headstock 10, to accommodate translational misalignment. One contemplated embodiment of the sliding means of the present invention comprises an upper rail 33 and a lower rail 34, which are horizontally oriented, parallel and spaced apart. The outboard side of block 26 is formed with a pair of continuous complementary-shaped upper and lower slots 43, 44, respectively, for mounting block 26 on rails 33, 34, respectively, of base 27 to enable the block to slide along base 27 when sufficient force is applied to the block to overcome the bias in tension devices 30. Tension devices 30 serve the dual purpose of preventing block 26 from moving along base 27 absent forces acting on block 26, and also serve to accurately position locating pin 28 for insertion into tailstock arm 13. Other embodiments of the sliding means also are contemplated, without affecting the overall concept of the present invention.

Having described fixture 14, including the inventive improvement thereto in the form of compliance devices 21, the method for accurately and removably positioning the fixture between headstock 10 and tailstock 11 now will be described. A structure such as slider 18 for a semi-trailer, is loaded onto and secured to fixture 14 by any ordinary means while fixture 14 is on top of carrier 15 and removed from between headstock 10 and tailstock 11, as shown in FIG. 1. It can be appreciated that loading/unloading of a structure to be assembled is much easier when fixture 14 is removed from between headstock 10 and tailstock 11, enabling loading/unloading by means other than inconvenient cranes or other lifting devices, such as by a conveyor, or the like. Also, operator 17 has 360 degree access to fixture 14 and the structure to be assembled in this position, enabling the operator to most efficiently prepare the structure for further assembly by convenient attachment to the fixture and the like. Carrier 15, along with fixture 14 and slider 18, then is moved into position between headstock 10 and tailstock 11 by any ordinary means, such as through the use of tracks 16. Once fixture 14 is positioned between headstock 10 and tailstock 11, each one of attachment elements 19 of the second end of fixture 14 are removably attached to its respective headstock arm 12 by any suitable means, such as through the use of clamps.

Each compliance device 21 on the first end of fixture 14 is removably attached to a respective one of tailstock arms 13. More specifically, the upper portion of each tailstock arm 13 is formed with an opening 38 for receiving the upper end of locating pin 28. More particularly, a hydraulically-operated piston 39 is positioned adjacent to and below a vertically oriented pin 40 slidably mounted in the lower portion of tailstock arm 13. Piston 39 engages and forces pin 40 upwardly against nut 32 to in turn force the upper end of locating pin 28 into engagement with complementary-shaped arm opening 38. Once fixture 14 is attached to both headstock arms 12 and tailstock arms 13, carrier 15 is removed from between the headstock 10 and tailstock 11 and returned to its loading/unloading position. As noted above, once engaged, blocks 26 still are free to move parallel to the centerline C of fixture 14 in the directions of double-ended arrow S to accommodate translational misalignment or changes in direction. Locating pins 28 also are free to rotate, as represented by double-ended arrow R, within block 26 and arm openings 38 to accommodate rotational changes as fixture 14 and the structure being assembled are rotated by headstock 10 for the final assembly operation performed by robotic welding or the like.

Thus, it can be seen that the present invention enables repeatable and accurate alignment of a removable fixture 14 between a headstock 10 and a tailstock 11, thus enabling easier loading/unloading of large components to be assembled such as slider 18 and providing an operator 17 with 360 degree access to the fixture and the structure to be assembled. More particularly, the alignment of fixture 14 is repeatable to within about 0.005 inches of its desired location. The present invention also reduces stress on fixture 14 and the structure being assembled during rotation, which is undesirable if left unreduced. Moreover, cranes and lifting devices for positioning the components to be assembled onto the fixture now can be replaced with safer, more efficient gravity conveyors.

The present invention is intended for use with removable fixtures/tools where the fixture is removed from the headstock/tailstock structures after every assembly cycle, either manually or with an automatic material handling system. Although developed for use in connection with a robotic welding cell, the concept of the present invention can be applied to numerous other applications such as stamping dies, machining operations, and the like.

Accordingly, the improved fixture and method for assembling structures is simplified, provides an effective, safe, inexpensive and efficient device which achieves all the enumerated objectives, provides for eliminating difficulties encountered with prior fixtures and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Moreover, the description and illustration of the invention is by way of example, and the scope of the invention is not limited to the exact details shown or described.

Having now described the features, discoveries and principles of the invention, the manner in which the improved fixture and method for assembling structures is used, the characteristics of the construction, arrangement and method steps, and the advantageous, new and useful results obtained; the new and useful structures, devices, elements, arrangements, process, parts and combinations are set forth in the appended claims.

What is claimed is:

1. An improved fixture for removably holding a structure to be assembled, said fixture being removably mountable between a headstock and a spaced-apart tailstock for moving said structure for assembly, said fixture including a frame having a first end and a second end, and a selected one of said first and second ends being immovably attached to a selected one of the headstock and the tailstock, wherein said improvement comprises:

a pair of positioning devices mounted on the other one of said selected first and second ends of said fixture frame, said positioning devices each being movable in the direction of said headstock and said tailstock and having a rotatably mounted locating pin for engaging the other one of said selected headstock and said tailstock, for reducing stress on said fixture and said structure to be assembled during movement of the fixture and the structure during assembly.

2. The improved fixture of claim 1 wherein each of said positioning devices further comprises a block, a stationary pin passing through each blocks, and a sliding means for sliding said each block along a base, said blocks each being slidably mounted to the base and movable in the direction of said headstock and said tailstock.

3. The improved fixture of claim 2 wherein each of said blocks further comprises a plurality of bearings which allow said locating pins to rotate within said blocks.

4. The improved fixture of claim 2 wherein said sliding means comprises at least one rail located along the base.

5. The improved fixture of claim 4 wherein each block comprises at least one continual opening that corresponds to and is for the receipt of said at least one rail, and upon which said each block slides in the direction of said headstock and said tailstock.

6. The improved fixture of claim 2 wherein each of said stationary pins is attached to and extends outward from a selected one of said first and second ends, and having a tension device disposed about each stationary pin adjacent to each block.

7. The improved fixture of claim 6 wherein said tension devices are springs.

8. The improved fixture of claim 2 wherein said each block is formed of steel.

9. The improved fixture of claim 2 wherein a selected one of said headstock and said tailstock has a plurality of holes located therein for receipt of said locating pins.

10. The improved fixture of claim 9 wherein a selected one of said headstock and said tailstock has an inserting means for inserting said locating pins into said holes.

11. The improved fixture of claim 10 wherein said inserting means is a piston.

12. A method for assembling a structure on an improved fixture that can be removably and accurately positioned between a headstock and a tailstock, said headstock and tailstock being spaced apart and aligned, said improved fixture comprising a frame having a first end and a second end, and at least two compliance devices disposed on a selected one of said first end and said second end of the frame, and each one of said at least two compliance devices further comprising a movable block with a locating pin rotatably mounted therein, said method comprising the steps of:

a) immovably attaching the structure to the improved fixture;
b) positioning said improved fixture and said structure between said headstock and the tailstock;
c) immovably attaching the other one of said selected first and second end of the frame to its respective one of the headstock and the tailstock, and movably attaching the selected one of frame first end and second end to its respective headstock and tailstock.

13. The method for assembling a structure on an improved fixture of claim 12 wherein a selected one of said headstock and said tailstock has a plurality of holes located therein for receipt of said locating pins.

14. The method for assembling a structure on an improved fixture of claim 13 further comprising the step of inserting each of said locating pins into said plurality of holes.

15. The method for assembling a structure on an improved fixture of claim 12 in which each of said compliance devices further comprises a block, a stationary pin passing through each blocks, and a sliding means for sliding each block along a base, said blocks each being slidably mounted to the base and movable in the direction of said headstock and said tailstock.

16. The method for assembling a structure on an improved fixture of claim 15 wherein said sliding means comprises at least one rail located along the base, and wherein each block comprises at least one continual opening that corresponds to and is for the receipt of said at least one rail, and upon which said each block slides in the direction of said headstock and said tailstock.

17. The method for assembling a structure on an improved fixture of claim 16 in which said stationary pins each are attached to and extend outward from a selected one of said first and second ends, and having a tension device disposed of about each stationary pin adjacent to each block.

18. The method for assembling a structure on an improved fixture of claim 17 further comprising the step of adjusting the tension in said tension devices for accurate positioning of said improved fixture and said structure between said headstock and the tailstock.

19. The method for assembling a structure on an improved fixture of claim 12 in which said improved fixture and said structure are moved into position between said headstock and said tailstock on a carrier along a pair of spaced apart, parallel tracks.

20. The method for assembling a structure on an improved fixture of claim 19 further comprising the step of removing said carrier from between the headstock and said tailstock upon immovably attaching the other one of said selected first and second end of the frame to its respective one of the headstock and the tailstock, and movably attaching the selected one of frame first end and second end to its headstock and tailstock.

* * * * *